United States Patent
Nomura et al.

(10) Patent No.: US 12,248,669 B2
(45) Date of Patent: Mar. 11, 2025

(54) CONTROL DEVICE, SYSTEM, AND PROGRAM

(71) Applicant: KABUSHIKI KAISHA TOKAI RIKA DENKI SEISAKUSHO, Aichi (JP)

(72) Inventors: Keiji Nomura, Aichi (JP); Toshihito Takai, Aichi (JP); Kenji Murata, Aichi (JP); Keita Nakane, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 84 days.

(21) Appl. No.: 17/430,905

(22) PCT Filed: Mar. 2, 2020

(86) PCT No.: PCT/JP2020/008673
§ 371 (c)(1),
(2) Date: Aug. 13, 2021

(87) PCT Pub. No.: WO2020/195577
PCT Pub. Date: Oct. 1, 2020

(65) Prior Publication Data
US 2022/0137803 A1 May 5, 2022

(30) Foreign Application Priority Data

Mar. 26, 2019 (JP) .................. 2019-059341
Feb. 28, 2020 (JP) .................. 2020-033493

(51) Int. Cl.
*G06F 3/04847* (2022.01)
*B60W 50/14* (2020.01)
(Continued)

(52) U.S. Cl.
CPC ......... *G06F 3/04847* (2013.01); *B60W 50/16* (2013.01); *G06F 3/03547* (2013.01); *G06F 3/04842* (2013.01); *B60W 2050/146* (2013.01)

(58) Field of Classification Search
CPC ............. G06F 3/04847; G06F 3/04842; G06F 3/03547; B60W 50/16; B60W 2050/146
See application file for complete search history.

(56) References Cited

U.S. PATENT DOCUMENTS 11,472,437 B2 * 10/2022 Suzuki ............... B60R 16/02
2003/0071795 A1 * 4/2003 Baldauf ............ G06F 3/03547
                                                              345/173
(Continued)

FOREIGN PATENT DOCUMENTS

JP     2003-108311     4/2003

OTHER PUBLICATIONS

International Search Report issued in International Patent Application No. PCT/JP2020/008673, dated Apr. 21, 2020.
(Continued)

*Primary Examiner* — Jeremy L Stanley
(74) *Attorney, Agent, or Firm* — Greenblum & Bernstein, P.L.C.

(57) ABSTRACT

To allow a user to more intuitively grasp processing executed in accordance with an operation. There is provided a control device including: a reception unit that receives an operation on at least one operation unit, and a control unit that sets, as a specific function, a function of executing at least one processing in accordance with contents of the operation received by the reception unit, and controls a notification unit to perform a notification in accordance with each of processing executed by the specific function.

6 Claims, 4 Drawing Sheets

(51) Int. Cl.
   *B60W 50/16* (2020.01)
   *G06F 3/0354* (2013.01)
   *G06F 3/04842* (2022.01)

(56) References Cited

U.S. PATENT DOCUMENTS

| | | | | |
|---|---|---|---|---|
| 2008/0270001 | A1* | 10/2008 | Seto | B60K 31/00 |
| | | | | 701/93 |
| 2010/0017084 | A1* | 1/2010 | Riegel | B60T 8/1755 |
| | | | | 701/1 |
| 2012/0109515 | A1* | 5/2012 | Uyeki | G01C 21/3469 |
| | | | | 701/423 |
| 2015/0025731 | A1* | 1/2015 | Uehara | B60W 50/14 |
| | | | | 701/23 |
| 2015/0134222 | A1* | 5/2015 | Ham | B60W 30/143 |
| | | | | 701/93 |
| 2015/0191169 | A1* | 7/2015 | Fairgrieve | B60W 30/143 |
| | | | | 701/93 |
| 2015/0293592 | A1* | 10/2015 | Cheong | G06F 1/163 |
| | | | | 345/173 |
| 2016/0052494 | A1* | 2/2016 | Yamamoto | B60T 8/4872 |
| | | | | 701/70 |
| 2017/0021762 | A1* | 1/2017 | Daman | B60Q 9/00 |
| 2017/0329406 | A1* | 11/2017 | Dabic | G06F 3/0421 |
| 2017/0355307 | A1* | 12/2017 | Ha | G08G 1/143 |
| 2017/0357317 | A1* | 12/2017 | Chaudhri | G06F 3/04883 |
| 2018/0074497 | A1* | 3/2018 | Tsuji | G06V 20/59 |
| 2018/0079411 | A1* | 3/2018 | Inoguchi | B60W 30/143 |
| 2018/0095608 | A1* | 4/2018 | Jablonski | G06F 3/0338 |
| 2018/0170348 | A1* | 6/2018 | Kim | B60W 50/0097 |
| 2019/0217863 | A1* | 7/2019 | Jung | B60W 30/18163 |
| 2019/0241198 | A1* | 8/2019 | Mori | G08G 1/16 |
| 2019/0310627 | A1* | 10/2019 | Halder | B60W 50/14 |
| 2019/0317522 | A1* | 10/2019 | Yang | B60W 30/18163 |
| 2020/0028736 | A1* | 1/2020 | Park | H04W 4/44 |
| 2020/0247396 | A1* | 8/2020 | Kim | B60W 30/06 |
| 2021/0089943 | A1* | 3/2021 | Choi | G06V 20/20 |
| 2021/0149397 | A1* | 5/2021 | Shin | G06V 10/764 |

OTHER PUBLICATIONS

Written Opinion of the International Searching Authorty issued in International Patent Application No. PCT/JP2020/008673, dated Apr. 21, 2020.

* cited by examiner

CONTROL DEVICE, SYSTEM, AND PROGRAM

TECHNICAL FIELD

The present invention relates to a control device, a system, and a program.

BACKGROUND ART

Recently, there have been developed a number of systems adopting a graphical user interface (GUI). For example, Patent Literature 1 discloses a system capable of executing functions corresponding to command input options displayed on a monitor by operating a touch pad.

Moreover, in the system disclosed in Patent Literature 1, an input field corresponding to the above-described command input option is arranged on a touch pad. When a user touches the input field, the user performing the operation is notified, and the function corresponding to the command input option is executed. With such a control, a user can perform a desirable operation without constantly gazing at a monitor.

Incidentally, in the above-described system, executed processing may be changed depending on the contents of received operations. However, if a notification is performed here in the same mode regardless of the kind of executed processing, it may be difficult for a user to determine whether the processing executed in accordance with an operation is processing desired by the user.

CITATION LIST

Patent Literature

Patent Literature 1: Japanese Patent Application Laid-open No. 2003-108311

SUMMARY OF INVENTION

Technical Problem

In view of the above-described problem, the present invention aims at providing a mechanism capable of allowing a user to more intuitively grasp the processing executed in accordance with an operation.

Solution to Problem

In order to solve the above-described problem, an aspect of the present invention provides a control device including a reception unit that receives an operation on at least one operation unit, and a control unit that sets, as a specific function, a function of executing at least one processing in accordance with contents of the operation received by the reception unit, and controls a notification unit to perform a notification in accordance with each of processing executed by the specific function.

Moreover, in order to solve the above-described problem, another aspect of the present invention provides a system including at least one operation unit, a reception unit that receives an operation on the operation unit, and a control unit that sets, as a specific function, a function of executing at least one processing in accordance with contents of the operation received by the reception unit, and controls the notification unit to perform a notification in accordance with each of processing executed by the specific function.

Moreover, in order to solve the above-described problem, another aspect of the present invention provides a program controlling a computer to achieve a reception function for receiving an operation on at least one operation unit, and a control function for setting, as a specific function, a function of executing at least one processing in accordance with contents of the operation received by the reception function, and controlling a notification unit to perform a notification in accordance with each of processing executed by the specific function.

Advantageous Effects of Invention

The present invention described above provides a mechanism allowing a user to more intuitively grasp the processing executed in accordance with an operation.

DESCRIPTION OF EMBODIMENTS

Hereinafter, referring to the appended drawings, preferred embodiments of the present invention will be described in detail. It should be noted that, in this specification and the appended drawings, structural elements that have substantially the same function and structure are denoted with the same reference signs, and repeated explanation thereof is omitted.

EMBODIMENTS

Configuration Example

Figure 1:
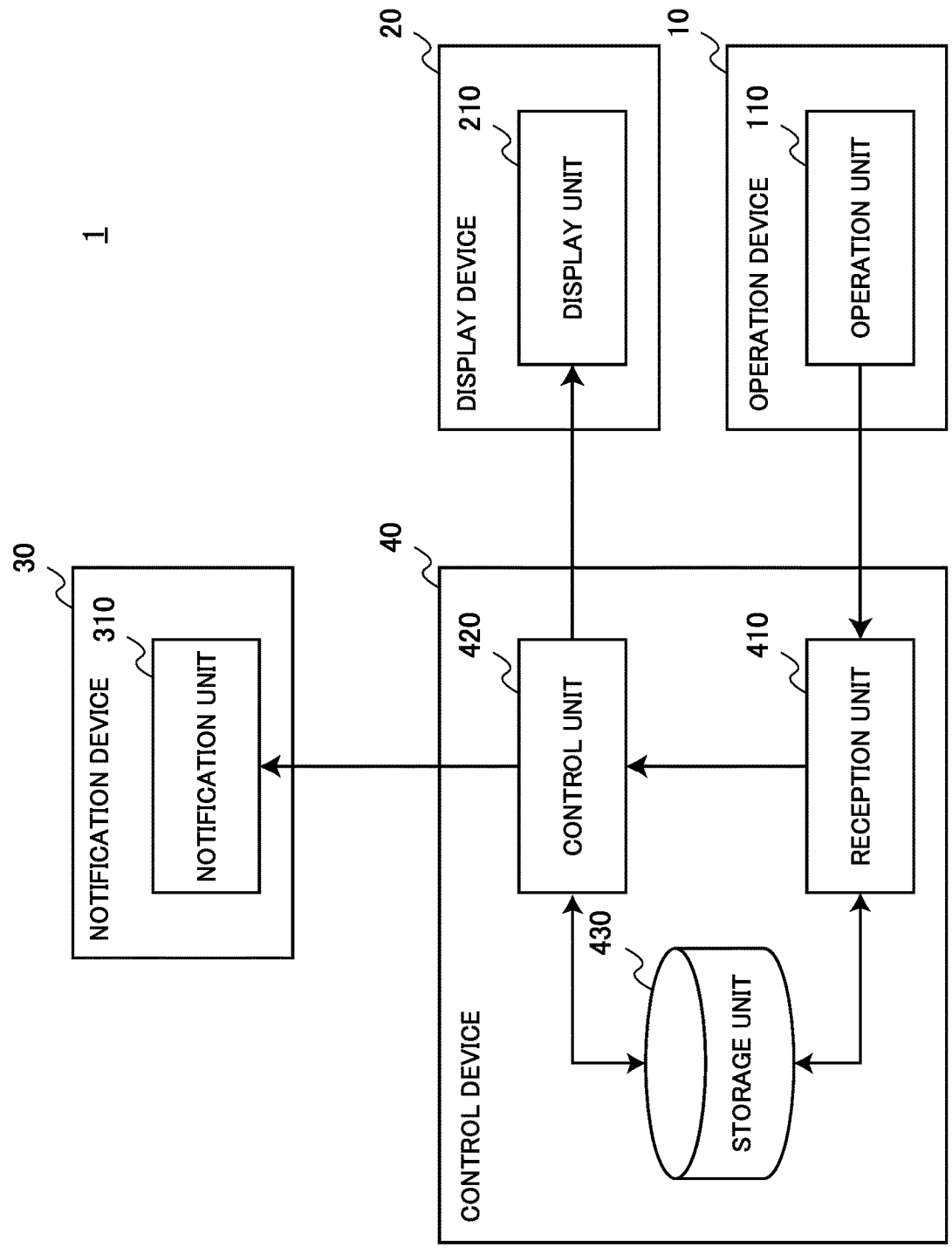
FIG. 1 is a diagram illustrating a functional configuration example of a system according to an embodiment of the present invention.

First, there will be described a configuration example of a system 1 according to an embodiment of the present invention. FIG. 1 is a diagram illustrating a functional configuration example of the system 1 according to the embodiment. As illustrated in FIG. 1, the system 1 of the embodiment includes, for example, an operation device 10, a display device, 20, a notification device 30, and a control device 40.

(Operation Device 10)

The operation device 10 of the embodiment is a device that is a target on which a user performs operations. The system 1 of the embodiment may include at least one or more operation devices 10. The operation device 10 of the embodiment may be, for example, a touch pad, a track ball, a mouse, a wheel, a slide switch, or the like. The operation device 10 of the embodiment includes an operation unit 110.

The operation unit 110 of the embodiment has a function of detecting user's operation. For this, the operation unit 110 may include various detection mechanisms in accordance with the modes of the operation device 10. For example, in a case where the operation device 10 is a touch pad, the operation unit 110 may include a pressure sensitive sensor converting a pressure varying with user's operation into electric signals, or an electrostatic capacitance sensor converting a change of an electrostatic capacity varying with user's operation into electric signals. Moreover, the operation unit 110 may include a switch for detecting a push operation by a user. The operation unit 110 transmits signals related to detected user's operation to the control device 40.

(Display Device 20)

The display device 20 of the embodiment is a device that displays visual information such as an image. The display device 20 of the embodiment may be various kinds of display devices. The display device 20 of the embodiment includes a display unit 210.

The display unit 210 of the embodiment may display images on the basis of signals input from the control device 40.

(Notification Device 30)

The notification device 30 of the embodiment is a device that performs various notifications to a user in accordance with the control by the control device 40. The notification device 30 of the embodiment includes a notification unit 310.

The notification unit 310 of the embodiment performs a notification based on control signals input from the control device 40. For this, the notification unit 310 includes various output mechanisms in accordance with the modes of notifications. For example, in the case of performing a notification using the tactile perception of a user, the notification unit 310 may include various kinds of actuators capable of generating vibration stimulations, electric stimulations, pressing stimulations, warm/cold stimulations, or the like. For example, in the case of performing a notification using vibration stimulations, the notification unit 310 may include an eccentric rotating mass (ERM), a linear resonant actuator (LRA), or a piezo (electric) element, a voice coil motor, or the like. Moreover, the notification unit 310 may include a plurality of actuators of the same kind or different kinds.

Moreover, in the case of performing a notification using the auditory sense of a user, for example, the notification unit 310 may include a speaker or an amplifier. Moreover, in the case of performing a notification using the visual sense of a user, for example, the notification unit 310 may include various kinds of lighting emitting light.

Note that the notification by the notification unit 310 may be performed by the combination of a plurality of different kinds of stimulations. For example, the notification unit 310 may perform a notification using vibrations and sound. Moreover, the notification unit 310 may perform a notification using electric stimulations and light, for example. The notification unit 310 of the embodiment performs a notification using at least one of vibrations, sound, and light, on the basis of the control by the control device 40.

(Control Device 40)

The control device 40 of the embodiment is a device that receives user's operation on the operation device 10, sets, as a specific function, a function of executing at least one processing in accordance with the contents of the operation, and controls the notification device 30 to perform a notification in accordance with each of processing executed by the specific function. The control device 40 of the embodiment includes a reception unit 410, a control unit 420, and a storage unit 430.

The reception unit 410 of the embodiment has a function of receiving an operation on at least one operation unit 110. For example, the reception unit 410 receives electric signals generated by the operation unit 110 on the basis of the detected user's operation, and receives an operation in accordance with the electric signals.

The control device 420 of the embodiment sets, as a specific function, a function of executing at least one processing in accordance with the contents of an operation received by the reception unit 410, and controls the notification unit 310 of the notification device 30 to perform a notification in accordance with each of processing executed by the specific function. The function of the control unit 420 is achieved by the cooperation of a processor such as a central processing unit (CPU), a random access memory (RAM), and the like. The notification control by the control unit 420 of the embodiment will be separately described in detail.

The storage unit 430 of the embodiment stores various kinds of information related to the actions of the control device 40. The storage unit 430 stores, for example, a program and the like for notification processing executed by the control unit 420.

The above has described the functional configuration example of the system 1 of the embodiment. Note that the functional configuration using FIG. 1 is an example, and the functional configuration of the system 1 of the embodiment is not limited thereto. For example, the operation device 10 and the notification device 30 may be formed as an integrated device. In this case, a notification using vibration stimulations is performed, for example, whereby it is possible to achieve a notification as a feedback to user's operation on the operation device 10. The functional configuration of the system 1 of the embodiment can be modified flexibly depending on specifications and uses.

<Details>

The following will specifically describe the functions of the system 1 according to the embodiment. Note that the following supposes, as a main example, a case where the system 1 of the embodiment is applied to a vehicle interior of a mobile body such as a vehicle. For example, at least one or more operation units 110 may be provided at a spoke of a steering. Moreover, the notification unit 310 may be formed integrally with the operation unit 110, and perform a notification using vibration stimulations. Moreover, the display unit 210 may be provided as (a part of) an instrument panel, or provided at a center console.

In this case, the control device 40 of the embodiment may receive user's operation on the operation unit 110, and control execution of various functions related to a mobile body on the basis of the operation. Examples of the above-described functions include an adaptive cruise control (ACC) that is a function for constantly keeping a travelling speed and a distance to a preceding mobile body.

Here, it is supposed that a user performs an operation related to the ACC. For example, the user may be able to perform, using the operation unit 110, an operation on an icon or the like displayed on the display unit 210, and arbitrarily set a traveling speed and a distance between vehicles. In this case, a plurality of processing are transited and executed, in accordance with operations performed by the user.

The examples of the above-described processing include selection processing for selecting an item such as an icon, cancelling processing for cancelling a selected state of a selected item, determination processing for determining a selected item, and the like. However, here, when the above-described processing is performed in accordance with an operation, and if a notification is performed in the same manner regardless of the kind of processing, it may be difficult for a user to intuitively grasp what kind of processing is executed in accordance with an operation performed by the user.

The technical ideas of the present invention have been made in view of the above-described aspects, and enables a user to more intuitively grasp the processing executed in accordance with an operation. For this, the control unit 420 of the embodiment may set, as a specific function, a function of executing at least one processing in accordance with the contents of an operation received by the reception unit 410, and control the notification unit 310 to perform a notification in accordance with each of processing executed by the specific function.

The above-described specific function may include a transition of processing executed in accordance with operations. In this case, the control unit 420 of the embodiment may control the notification unit 310 to perform a notification in accordance with processing transited in according with operations. With such control, a user can intuitively grasp the kind and the like of processing transited in accordance with operations performed by the user.

As a more concrete example, the above-described specific function may include any of the selection processing, cancellation processing, and determination processing that are described above. In this case, the control unit 420 of the embodiment may control the notification unit 310 to perform a different notification in accordance with each of the selection processing, cancellation processing, and determination processing that are performed by the specific function. With such control, a user can intuitively grasp which of the above-described three processing is executed in accordance with an operation performed by the user.

Figure 2:
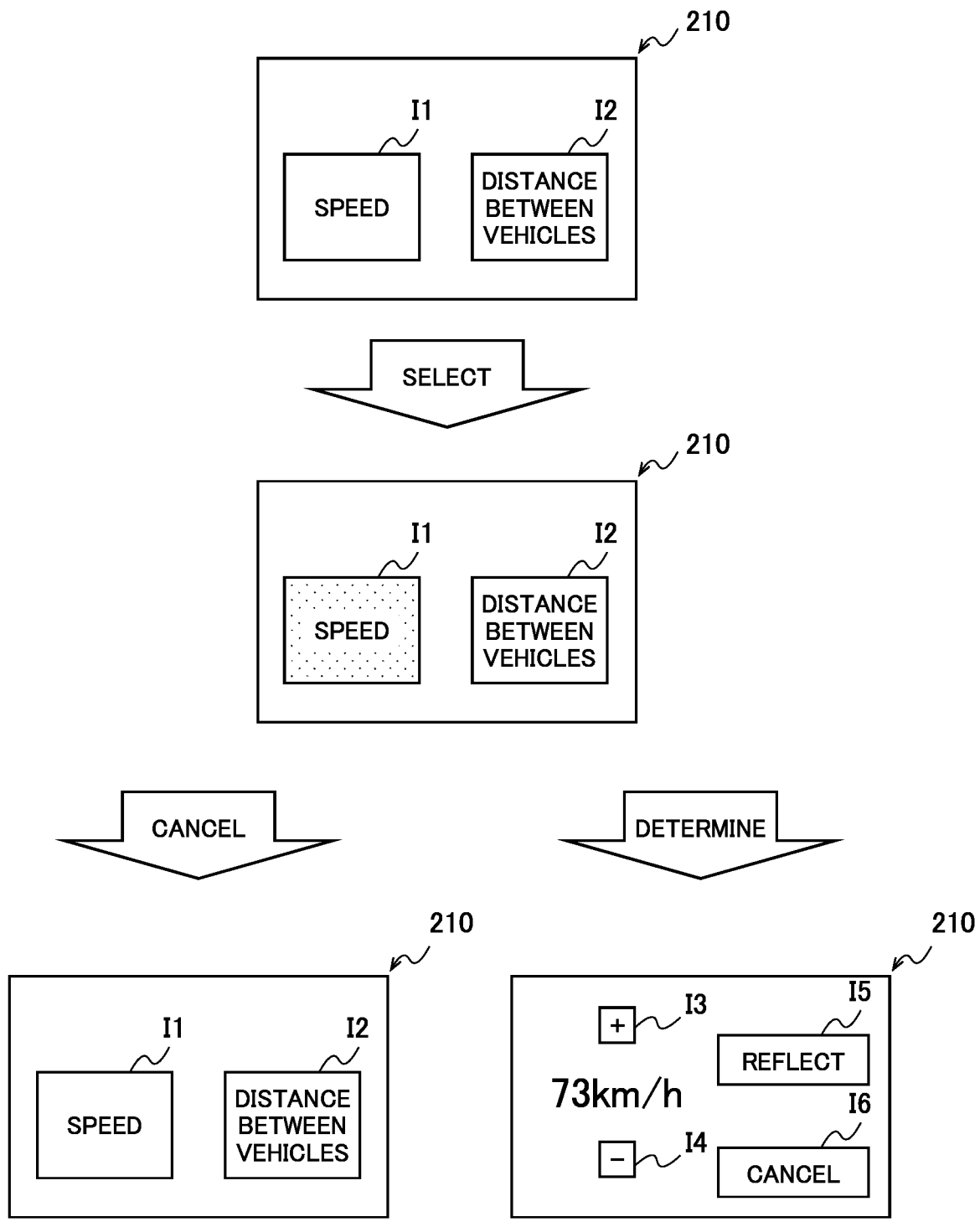
FIG. 2 is a diagram for explaining notification control in accordance with each of processing executed by a specific function according to the embodiment.

The following will describe concrete examples of the notification control according to the embodiment using FIG. 2. FIG. 2 is a diagram for explaining notification control in accordance with each of processing executed by a specific function according to the embodiment.

FIG. 2 illustrates an example of the screen transition of the display unit 210 when a user performs an operation related to ACC. For example, FIG. 2 illustrates, in the upper stage thereof, an icon I1 for a transition to a screen for a setting related to a travelling speed, and an icon I2 for a transition to a screen for a setting related to a distance between vehicles. Note that in the example illustrated in the upper stage of FIG. 2, both the icon I1 and the icon I2 are unselected. In this case, the user can perform, using the operation unit 110, an operation of selecting either the icon I1 or the icon I2. The above-described operation may be, for example, an operation of overlapping a cursor or the like (not illustrated) displayed on the display unit 210 on either the icon I1 or the icon I2.

FIG. 2 illustrates, in the middle stage thereof, an example of the case where the user has performed an operation of selecting the icon I1 from the state of the example illustrated in the upper stage of FIG. 2. Here, the control unit 420 may set, as a specific function, a function of executing selection processing for selecting the icon I1 in accordance with the contents of the above-described operation received by the reception unit 410. That is, the control unit 420 of the embodiment controls the notification unit 310 to perform a notification in accordance with the selection processing related to the icon I1.

Then, the control unit 420 may control the notification unit 310 to perform a notification using a parameter preliminarily set corresponding to the selection processing. For example, in a case where the notification unit 310 is controlled to perform a notification using vibration stimulations, the above-described parameter may be an acceleration, frequency, vibration time, number of times of vibrations, or the like. With such control, the user can intuitively grasp that the selection processing related to the icon I1 has been executed by the operation. Note that the example illustrated in the middle stage of FIG. 2 highlights, by a dotted pattern, the selected state of the icon I1 resulted by the above-described selection processing.

Moreover, FIG. 2 illustrates, on the left side of the lower stage thereof, an example of the case where the user has performed an operation of cancelling the selected state of the icon I1 from the state of the example illustrated in the middle stage of FIG. 2. The above-described operation may be, for example, an operation of moving a cursor or the like displayed on the display unit 210 to the outside of the display area of the icon I1. Then, the control unit 420 may set, as a specific function, a function of cancelling the selected state of the icon I1 in accordance with the contents of the above-described operation received by the reception unit 410. That is, the control unit 420 of the embodiment controls the notification unit 310 to perform a notification in accordance with the cancellation processing related to the icon I1.

Then, the control unit 420 may control the notification unit 310 to perform a notification using a parameter preliminarily set corresponding to the cancellation processing. Here, the parameter preliminarily set corresponding to the cancellation processing may be different at least partially from the parameter preliminarily set corresponding to the selection processing. With such control, the notification unit 310 performs a notification in a mode different from the time of executing the above-described selection processing, which allows the user to intuitively grasp that the cancellation processing related to the icon I1 has been executed by the operation.

On the other hand, FIG. 2 illustrates, on the right side of the lower stage thereof, an example of the case where the user performs an operation of determining the selected state of the icon I1 from the state of the example illustrated in the middle stage of FIG. 2. The above-described operation may be, for example, an operation of pressing the operation unit 110 when the icon I1 is selected. Here, the control unit 420 may set, as a specific function, the determination processing of determining the selected state of the icon I1 in accordance with the contents of the above-described operation received by the reception unit 410. That is, the control unit 420 of the embodiment controls the notification unit 310 to perform a notification in accordance with the determination processing related to the icon I1.

Then, the control unit 420 may control the notification unit 310 to perform a notification using a parameter preliminarily set corresponding to the determination processing. Here, the parameter preliminarily set corresponding to the determination processing may be different at least partially from the parameter preliminarily set corresponding to the selection processing or cancellation processing. With such control, the notification unit 310 performs a notification in a mode different from the time of executing the above-described selection processing or cancellation processing, which allows the user to intuitively grasp that the determination processing related to the icon I1 has been executed by the operation. Note that the example on the right side in the lower stage of FIG. 2 illustrates the state where the screen displayed by the display unit 210 has been transited to a screen for setting a travelling speed by the above-described determination operation.

The following will describe notification control based on whether the execution of processing by a specific function is possible according to the embodiment. The above has described, as a main example, the case where the control unit 420 of the embodiment controls a notification in accordance with each of processing executed by a specific function. With such control, a user can intuitively grasp that the operation performed by the user has been received. However, even when the operation has been received normally, there is also supposed a case where the determination of whether the operation in accordance with such an operation is to be executed may differ depending on various conditions. In such a case, it is difficult for a user to determine whether the processing corresponding to the operation has been actually performed.

For this, the control unit 420 of the embodiment may control the notification unit 310 to perform a notification in accordance with whether the execution of the processing by a specific function is possible. With such control, the user can intuitively grasp whether the processing in accordance with an operation has been actually performed on the basis of the operation performed by the user.

Figure 3:
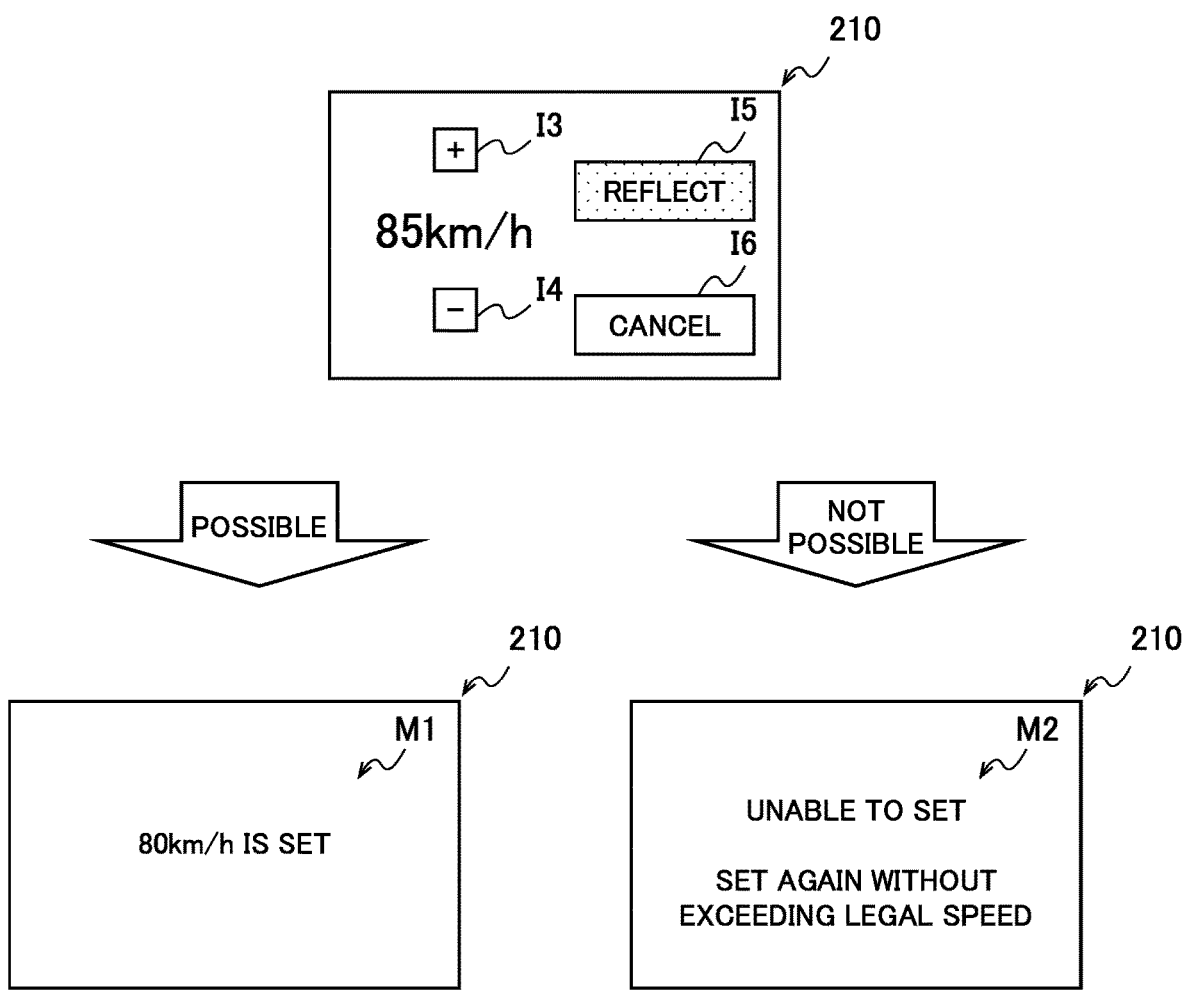
FIG. 3 is a diagram for explaining notification control based on whether the execution of processing by a specific function is possible according to the embodiment.

FIG. 3 is a diagram for explaining notification control based on whether the execution of processing by a specific function is possible according to the embodiment. FIG. 3 illustrates, in the upper stage thereof, an example of a screen for when a user performs a changing operation related to a travelling speed of a mobile body. Here, the icon I3 may be an icon for changing a setting value of a travelling speed to an increasing direction. Moreover, the icon I4 may be an icon for changing a setting value of a travelling speed to a decreasing direction. The user may be able to adjust a setting value of a traveling speed to an arbitrarily value by performing an operation on the icon I3 or the icon I4.

Moreover, the icon I5 may be an icon for reflecting a change of a setting value of a travelling speed performed using the icon I3 or the icon I4. Meanwhile, the icon I6 may be an icon for cancelling the reflection of a setting of a travelling speed. Note that the example in the upper stage of FIG. 3 illustrates a situation where the icon I6 is selected as described above.

In the above-described situation, when an operation corresponding to the above-described determination processing has been received, the control unit 420 determines whether a setting value of a travelling speed can be actually reflected, that is, whether the execution of determination processing is possible. For example, when the setting value is 83 km/h and a legal speed in a travelling road environment is 90 km/h, the control unit 420 may determine that the execution of the above-described determination processing is possible, and control the execution of reflection processing of the setting value. In this case, the control unit 420 may display, on the display unit 210, a message M1 indicating that the setting value is reflected, as illustrated on the left side in the lower stage of FIG. 3, for example. Moreover, here, the control unit 420 controls the notification unit 310 to perform a notification indicating that the determination processing has been performed.

Meanwhile, when the setting value is 83 km/h and a legal speed in a travelling road environment is 80 km/h, for example, the control unit 420 may determine that the execution of the above-described determination processing is not possible. In this case, the control unit 420 may display, on the display unit 210, a message M2 indicating that the setting value cannot be reflected, as illustrated on the right side in the lower stage of FIG. 3, for example. Moreover, the notification unit 310 is controlled to perform a notification indicating that the execution of determination processing is not possible, that is, a notification indicating that the execution of determination processing is not possible. Here, the control unit 420 may control the notification unit 310 to perform a notification in a mode different from the case where the execution of determination processing is possible. With such control, even when the user does not gaze at the display unit 210, the user can intuitively grasp that the execution of determination processing based on the operation by the user has not been possible.

Note that the above has exemplified the case where the control unit 420 controls a notification on the basis of whether the execution of determination processing is possible. However, the notification unit 420 may control a notification on the basis of whether the execution of selection processing or cancellation processing is possible. For example, when the execution of selection processing is not possible, the control unit 420 can control the notification unit 310 to perform a notification indicating that the execution of selection processing is not possible, and when the execution of cancellation processing is not possible, the control unit 420 can control the notification unit 310 to perform a notification indicating that the execution of cancellation processing is not possible.

<Flow of Actions>

Figure 4:
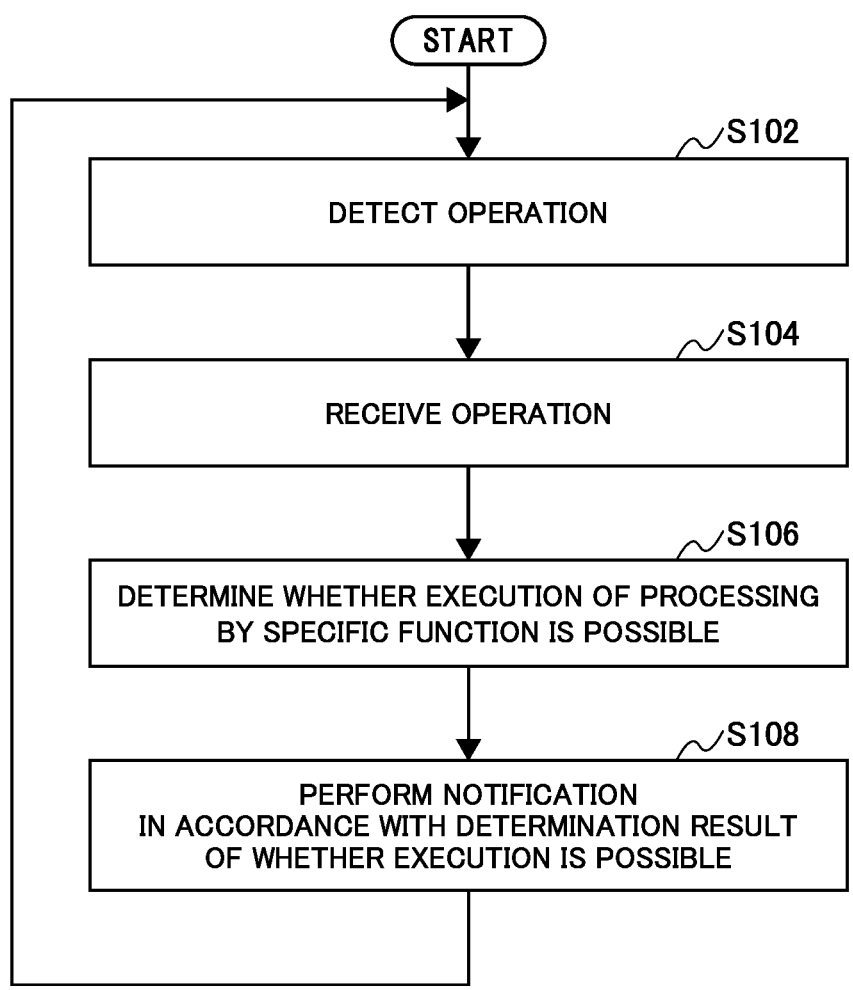
FIG. 4 is a flow chart illustrating a flow of actions of the system according to the embodiment.

The following will specifically describe a flow of actions of the system 1 according to the embodiment. FIG. 4 is a flow chart illustrating a flow of actions of the system 1 according to the embodiment.

As illustrated in FIG. 4, the operation unit 110 detects user's operation first (S102). The operation unit 110 outputs signals related to the detected operation to the reception unit 410.

Next, on the basis of the signals input at Step S102, the reception unit 410 receives an operation corresponding to such signals (S104). The reception unit 410 inputs information related to the received operation to the control unit 420.

Next, on the basis of the information input at Step S104, the control unit 420 determines whether the execution of processing by a specific function is possible (S106). Note that the determination criteria of whether the execution is possible at Step S106 may be appropriately designed in accordance with characteristics and the like of processing to be executed.

Next, the control unit 240 controls the notification unit 310 to perform a notification in accordance with a determination result of whether the execution is possible at Step S106 (S108). For example, in a case where the processing executed by a specific function is any of selection processing, cancellation processing, and determination processing, the control unit may control the notification unit 310 to perform a notification in a mode different for each of the six patterns in total including the cases where the execution of each of the above-described three processing is possible and the cases whether the execution of each thereof is not possible. With such control, a user can intuitively grasp which processing has been received by the operation performed by the user and whether the processing has been executed.

<Supplement>

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

A sequence of processing by the devices described in the specification may be achieved using any of software, hardware, and the combination of software and hardware. Programs forming the software is preliminarily stored in recording media (non-transitory media) provided inside or outside the devices, for example. Then, each program is read in a random access memory (RAM) when executed by a computer, and executed by a processor such as a central processing unit (CPU), for example. The above-described recording media are, for example, a magnetic disk, an optical disk, a magneto-optical disk, a flash memory, and the like. Moreover, the above-described computer program may be distributed through a network, for example, without using any recording medium.

REFERENCE SIGNS LIST 1 system
10 operation device
110 operation unit
20 display device
210 display unit
30 notification device
310 notification unit
40 control device
410 reception unit
420 control unit
430 storage unit

The invention claimed is:

1. A control device, comprising:
a controller, including at least a processor and a memory, configured to:
receive operations on at least one operator that includes at least a sensor;
set, as specific functions, functions of executing at least two processing in accordance with contents of the operations received; and
control a notifier, including at least an actuator, configured to perform a notification, among a plurality of different notifications, in accordance with each processing executed by the specific functions, each notification being different from at least one previous notification, and each notification including a combination of at least two different notification mechanisms, and
a display configured to display images including icons on a basis of signals input from the controller, the icons related to the processing executed by the specific functions,
wherein the specific functions include at least execution of a selection processing for selecting an item to be operated, a cancellation processing for cancelling a selected state of the selected item, and a determination processing for determining the selected item,
the controller is further configured to control the notifier to perform a notification, among the plurality of different notifications, using a parameter in accordance with at least one of the selection processing, the cancellation processing and the determination processing executed by the specific functions,
the parameter for the selection processing, the cancellation processing and the determination processing are each a different parameter,
the controller is further configured to control the notifier to perform a notification, among the plurality of different notifications, in accordance with whether the execution of processing by each of the specific functions is possible,
the controller is further configured to control, in a state in which the execution of the processing by each of the specific functions is not possible, the notifier to perform a notification, among the plurality of different notifications, indicating that the execution of the specific functions is not possible,
the determination processing determines whether a setting value of a travelling speed adjusted by a user is possible, and the controller is further configured to control the notifier to perform a notification, among the plurality of different notifications, if the determination processing is possible, or a notification, among the plurality of different notifications, if the determination processing is not possible, and
the controller is configured to control the notifier to perform the plurality of different notifications using the combination of the at least two different notification mechanisms, the different notification mechanisms including at least vibrations, sound, or light.

2. The control device according to claim 1, wherein
the specific functions include a transition of processing executed in accordance with the operation, and
the controller is configured to control the notifier to perform a notification, among the plurality of different notifications, in accordance with the transition of processing in accordance with the operation.

3. The control device according to claim 1, wherein the icons include at least an icon for changing a setting value of a traveling speed to an increasing direction, an icon for changing the setting value of the traveling speed to a decreasing direction, an icon for reflecting a change of the setting value of the traveling speed, and an icon for cancelling the reflection of the setting value of the traveling speed.

4. The control device according to claim 1, wherein the display is further configured to display a message indicating that the setting value is possible, in a state in which the setting value of the traveling speed can be realized, and a message indicating that the setting value is not possible, in a state in which the setting value of the traveling speed cannot be realized.

5. A system, comprising:
at least one operator that includes at least a sensor;
a notifier, including at least an actuator, configured to perform a notification, among a plurality of different notifications, to a user performing operations, each notification being different from at least one previous notification, and each notification including a combination of at least two different notification mechanisms;
a controller, including at least a processor and a memory, configured to:
receive the operations on the operator;
set, as specific functions, functions of executing at least two processing in accordance with contents of the operations received; and
control the notifier to perform a notification, among the plurality of different notifications, in accordance with each processing executed by the specific functions, and
a display configured to display images including icons on a basis of signals input from the controller, the icons related to the processing executed by the specific functions, wherein the specific functions include at least execution of a selection processing for selecting an item to be operated, a cancellation processing for cancelling a selected state of the selected item, and a determination processing for determining the selected item, the controller is further configured to control the notifier to perform a notification, among the plurality of different notifications, using a parameter in accordance with at least one of the selection processing, the cancellation processing and the determination processing executed by the specific functions, and the parameter for the selection processing, the cancellation processing and the determination processing are each a different parameter, the controller is further configured to control the notifier to perform a notification, among the plurality of different notifications, in accordance with whether the execution of processing by each of the specific functions is possible, the controller is further configured to control, in a state in which the execution of the processing by each of the specific functions is not possible, the notifier to perform a notification, among the plurality of different notifications, indicating that the execution of the specific functions is not possible, the determination processing determines whether a setting value of a travelling speed adjusted by a user is possible, and the controller is further configured to control the notifier to perform a notification, among the plurality of different notifications, if the determination processing is possible, or a notification, among the plurality of different notifications, if the determination processing is not possible, and the controller is configured to control the notifier to perform the plurality of different notifications using the combination of the at least two different notification mechanisms, the different notification mechanisms including at least vibrations, sound, or light.

6. A non-transitory computer readable storage medium having a program stored therein, the program causing a computer to achieve:

receiving operations on at least one operator that includes at least a sensor;

setting, as specific functions, functions of executing at least two processing in accordance with contents of the operations received;

controlling a notifier, including at least an actuator, to perform a notification, among a plurality of different notifications, in accordance with each processing executed by the specific functions, each notification being different from at least one previous notification, and each notification including a combination of at least two different notification mechanisms;

controlling the notifier to perform a notification, among the plurality of different notifications, using a parameter in accordance with at least one of a selection processing, a cancellation processing and a determination processing executed by the specific functions; and displaying images including icons on a basis of signals input from the computer, the icons related to the processing executed by the specific functions, wherein the specific functions include at least execution of the selection processing for selecting an item to be operated, the cancellation processing for cancelling a selected state of the selected item, and the determination processing for determining the selected item, and the parameter for the selection processing, the cancellation processing and the determination processing are each a different parameter, controlling the notifier to perform a notification, among the plurality of different notifications, in accordance with whether the execution of processing by each of the specific functions is possible, controlling, in a state in which the execution of the processing by each of the specific functions is not possible, the notifier to perform a notification, among the plurality of different notifications, indicating that the execution of the specific functions is not possible, when the determination processing determines whether a setting value of a travelling speed adjusted by a user is possible, controlling the notifier to perform a notification, among the plurality of different notifications, if the determination processing is possible, or a notification, among the plurality of different notifications, if the determination processing is not possible, and controlling the notifier to perform the plurality of different notifications using the combination of the at least two different notification mechanisms, the different notification mechanisms including at least vibrations, sound, or light.

* * * * *